Sept. 13, 1949.    J. D. TYLER    2,481,800
TRAP
Filed Aug. 21, 1946
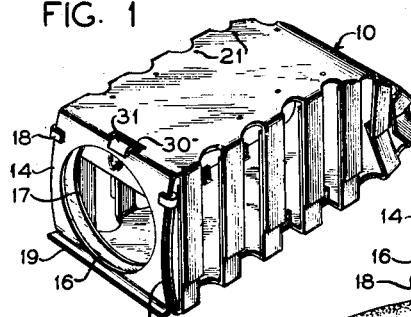
FIG. 1
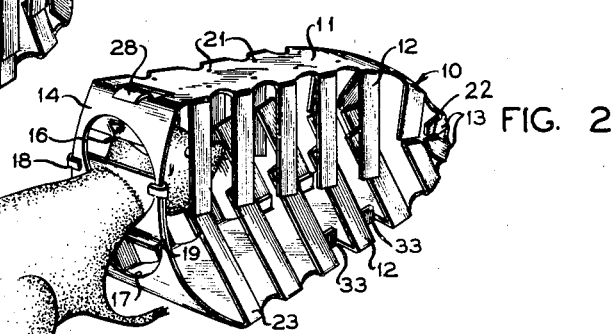
FIG. 2
FIG. 7
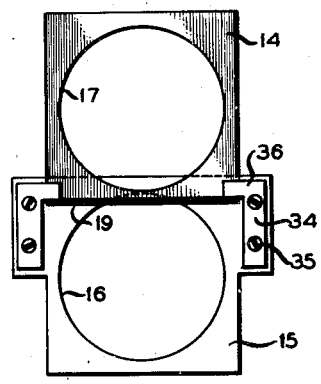
FIG. 8
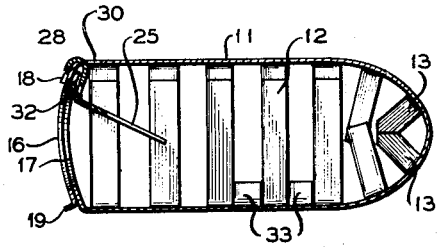
FIG. 6
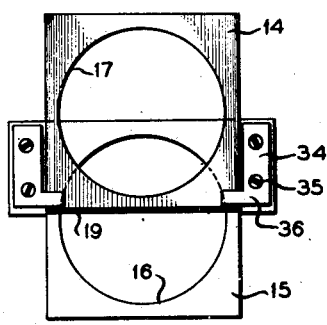
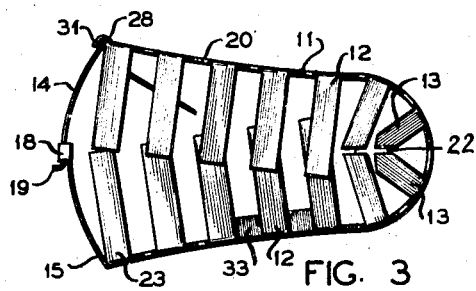
FIG. 3
INVENTOR.
J. D. TYLER
BY
*Ayates Dowell*
ATTORNEY
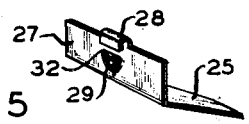
FIG. 5
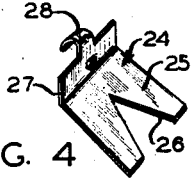
FIG. 4

Patented Sept. 13, 1949

2,481,800

UNITED STATES PATENT OFFICE 2,481,800

TRAP

John Duke Tyler, Nashville, Tenn., assignor to The Better Mouse Trap Company, Nashville, Tenn., a corporation of Tennessee Application August 21, 1946, Serial No. 691,918

5 Claims. (Cl. 43—85)

This invention relates to trapping and more particularly to a trap for catching mice, snakes, fowl, or other small creatures.

Heretofore numerous traps have been designed for this purpose, probably the most well known being circular and having openings in the periphery thereof across which spring-actuated loop members are disposed. These loop members are designed to grasp the neck of the animal or creature caught.

Other traps include the well known flat, rectangular wooden block having a spring actuated loop thereon for crushing the neck of the animal between the loop and the edge of the block.

These prior devices have numerous disadvantages such as being made of wood which renders sterilization difficult due to the absorption of water by the wood which causes the wood to warp, also due to the fact that the wood tends to absorb blood, odors, and the like, and in a short time will result in a disagreeable and very often unusable trap.

The traps of the prior art are also very objectionable due to difficulties in setting, small bait capacity, and difficulty in removing the trapped animal.

It is accordingly an object of this invention to provide a trap of simple and economical construction, formed of two stamped metal parts.

It is a further object of this invention to provide a trap of simple and economical construction formed of two plastic parts.

It is a further object to provide a trap having a large bait capacity and in which the bait cannot be removed without catching the animal.

It is a further object of this invention to provide a trap which can be easily handled for setting or for releasing a caught animal with no danger to the person and with no necessity for touching the animal being released therefrom.

It is a further object of the invention to provide a trap in which the force necessary to catch and hold an animal is provided entirely by the material of which the trap is formed and in which means is provided to prevent stressing of this material beyond its elastic limit.

It is a further object of this invention to provide a trap in which no additional fastening means are required, the trap being assembled and held together by tabs formed from the material of the trap.

Another object of the invention is to provide a trap in which the minimum size of the opening to receive the animal is adjustable.

It is a further object of this invention to provide a trap in which the speed of action is double that of the normal trap.

It is a further object of this invention to provide a trap which may be so adjusted that an animal will be caught and strangled without breaking the skin.

It is a further object of this invention to provide a trap in which there is no necessity for securing the bait in place, thus rendering the operation of the trap more pleasant to the user.

It is a further object of this invention to provide a trap formed of materials which may be sterilized in boiling water and in which the water has no harmful effect on the trap.

It is a further object of this invention to provide a trap which will not become objectionable or inoperative due to the absorption of blood, odors, moisture, or the like.

It is a still further object of this invention to provide a trap which can be easily and inexpensively manufactured in mass production and which will result in a fool-proof device.

Further objects and advantages of the invention will be apparent from the following specification taken in conjunction with the accompanying drawings, wherein:

Fig. 1 is a view in perspective showing the trap in set position;

Fig. 2, a view in perspective showing the trap in open position and with an animal such as a mouse caught therein;

Fig. 3, a side elevational view showing the curve of the body in open position;

Fig. 4, a rear view in perspective of the trigger member;

Fig. 5, a front view in perspective of the trigger member;

Figs. 6 and 7, front elevational views presenting a modified form of the invention; and Fig. 8, a sectional view taken on the longitudinal center line of Fig. 1 and showing the relative position of the jaws and trigger when the trap is in set condition.

With reference to the drawing a trap 10 constructed in accordance with the present invention has a main body 11 stamped from a single piece of sheet metal after which the metal is bent to a generally U-shape. On each side of the body there is provided a plurality of bars 12 extending at right angles to the main body part and overlapping to form a cage-like enclosure within the body. At the apex of the U-shaped body the side bars are formed in a cluster 13 for a purpose which will presently appear. The outer ends 14 and 15 of the U-shaped body are bent at right angles thereto forming jaw members occupying an overlapping position with relation to each other. These jaw members are provided with apertures 16 and 17 which when the trap is in set position as shown in Fig. 1 register with each other to provide an opening suitable for the entrance of the head of an animal to be caught.

The two parts of the trap may also be constructed of a suitable plastic material molded or otherwise formed to the desired shape.

In order to guide the overlapping jaw members and to limit the extent of movement thereof from set to open position, there is provided on the jaw 15 tabs 18 which are bent to overlap the jaw 14 and slide along the edge thereof which maintains the overlapping jaws in the same plane throughout the movement thereof. In order to limit the outward relative movement of the two overlapping jaws, there is provided on the jaw 14 a flange 19 which at the extreme outward movement of the overlapping jaws contacts the tabs 18 to act as a stop.

The force necessary to actuate the trap is provided entirely by the resilience of the material forming the body member. This resilience is increased by forming the legs of the U-shaped member in such manner that there is a slight outward curve thereof in the open position as shown at 20 in Fig. 3. The metal is further given a permanent set in this position by the provision of dimples 21 in the surface of the metal.

The side bars 13 which are formed in a cluster at the apex of the U are arranged in such a manner that the ends 22 thereof are slightly spaced when the trap is in open position as best shown in Fig. 2, but as the legs of the U are moved towards set position, the ends 22 contact each other, thus preventing collapse of the body member at the apex thereof. This means that after the ends 22 have contacted each other further bending of the material takes place forward of the bars 13 and when the trap reaches set position the curve 20 has completely disappeared and the leg of the U is substantially straight as shown in Fig. 1. In order to prevent stressing of the material of the trap beyond the elastic limit during setting operation, the side bars 12 are so proportioned as to length that the inner bars 23 contact the opposite leg of the U-shaped body thus preventing further inward movement and undue bending of the material.

In order to hold the trap in set position, there is provided a trigger best shown in Figs. 3 and 4 and generally indicated at 24. The trigger is formed from a single stamping and is of substantially L-shape, the longer leg 25 of the L being provided with a V-shaped notch 26 extending substantially the entire length thereof. The shorter leg 27 of the L is provided with a tab 28 and a struck-up portion 29 adjacent the tab. The trigger 24 is secured in place in the body of the trap by means of the tab 28 which projects through an aperture 30 in one leg of the U-shaped body, the end of the tab being bent over as shown at 31 to pivotally mount the trigger in the body. The tab 29 is provided with a curved edge 32 which with the trap in set position engages the upper inside edge of the aperture 17 in the overlapping jaw 15 to hold the trap in set position.

There is also provided in one leg of the U-shaped body member 10 auxiliary side bars 33 for the purpose of holding bait, such as cheese or the like, in place within the cage-like closure formed by the legs of the U-shaped body and the side bars.

In operation it is only necessary for a person to grasp the legs of the U-shaped body between the fingers with the hand of the user adjacent the apex thereof while holding the trap in a vertical position with the relatively movable apertures 16 and 17 downwardly and squeeze the two sides of the trap together. The trigger will be actuated by gravity to engage the inner aperture 17 at the point of registry with the aperture 16, at which time the trap will remain in set condition and may be placed in position after insertion of a suitable piece of bait within the enclosure. Upon the entrance of any animal, such as a mouse, shown at 34, the trigger member will be contacted and the trap released since only a very slight movement of the trigger member is required for such releasing action.

With the construction just described, it can be readily seen that the trap will operate efficiently when placed on either side of the U-shaped body member, since in one position the animal will contact the trigger with the top of its nose and in the other position would tend to climb over the trigger in order to enter the trap, the contacting force being sufficient in either case to release the trigger.

It has been found that the sensitiveness of the trigger may be varied by providing the contacting edge 32 of the struck-up portion 29 with radii of different dimensions, but the radius giving maximum sensitivity has been determined to be approximately ⅛ of the radius of the aperture 17, the inner circumferential edge of which the surface 32 contacts when in latched position.

In order to release a mouse or other animal which has been caught in the trap, it is only necessary to grasp the trap between the fingers as in the setting operation above described and invert the same over a receptacle with the animal hanging downwardly while squeezing the legs of the U toward each other which will immediately release the animal, allowing it to drop out without necessity of any human contact with the animal.

The structure above described is designed to catch and kill an animal within the limits of the trap by strangulation and the force exerted by the resilient material is sufficient for this purpose but it is not great enough to break the skin of the animal, thus removing the possibility of bloodshed which would tend to contaminate the trap.

In Figs. 5 and 6 there is shown a modified form of the invention in which there is substituted for the tabs 18 described above detachable tabs 34 secured to the overlapping jaw member 15 by screws or the like 35. The tabs 34 are so designed that they may be applied as shown in Fig. 5 in which case the inwardly extending ear 36 contacts the stop flange 19 in a position to limit the outward movement of the trap and thus prevent complete closing of the registering apertures 16 and 17, the trap in this condition being intended for use with animals having a larger neck or for the purpose of merely catching and holding an animal without strangulation.

In Fig. 6 the tabs 34 are shown attached to the overlapping jaw member 15 in inverted position, the ears 36 engaging the stop flange 19 in such a position that the registering apertures are completely closed and in which case strangulation of the caught animal will result.

It is thus seen that there is provided by the above described invention a trap of unique design in the preferred form of which there are only two parts and which can be readily operated for setting or for releasing an animal caught therein by the fingers of one hand without the necessity of human contact with the animal and further there is provided a trap which will receive a relatively large piece of bait which it is impossible for an animal to steal without getting caught. The unique design of this trap results in a speed of action at least double that of the conventional spring trap in that the relatively movable registering apertures are simultaneously actuated in opposite directions which results in a closing of the opening to which the animal's head is inserted at double the speed which would result if only one of the apertures were moved. The trap of this invention also lends itself readily to production by relatively unskilled labor in that the only operations necessary are the stamping of the body member and the trigger, the trap being assembled by inserting the trigger tab 28 through the aperture 30 and bending the tab over and the final step of bending the two tabs 18. Obviously this results in a very fast and economical production process.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A trap comprising a substantially U-shaped, resilient body having two legs each with a series of spaced side bars extending toward the other leg and providing a cage-like structure, relatively movable jaws carried by said body, means for limiting the outward movement of said jaws, a trigger member, means on said trigger member constructed and arranged to engage a portion of said body to hold the trap in set position, said side bars of one leg being of a length to overlap the adjacent side bars of the opposite leg and limit the movement of said legs toward each other.

2. In a trap a body structure comprising spaced portions connected by an intermediate portion, said spaced portions opposite said intermediate portion having inwardly turned perforated portions, the perforations of which are adapted to move into and out of alignment, said structure including means tending to separate said portions.

3. A trap comprising spaced portions constructed when disposed in associated relation to provide a cage, said spaced portions having an intermediate connecting portion of spring material tending to maintain said spaced portions apart but permitting said spaced portions to be brought closer together, said spaced portions having apertured portions providing overlapping jaws, the apertures of which are constructed to be in registration when the portions are pressed toward each other and adapted to be out of registration when the spaced portions are disposed apart, and trigger mechanism for maintaining said spaced portions such that their apertures are in alignment.

4. A trap comprising a one-piece resilient metal stamping forming a cage-like enclosure, jaw members formed integrally with said enclosure and movable relative to each other, a trigger member mounted in said enclosure, means on said trigger member to hold said trap in set position, the trap springing to open position upon release of said means by movement of said trigger, the movement of said trap toward open position being caused by the resilience of said stamping.

5. A trap comprising a one-piece resilient body member, jaw members formed integrally with said body member and movable relative to each other, a trigger member movably mounted in said body member, means on said trigger member to hold said trap in set position, said trap being biased toward open position by the resilience of said body member.

JOHN DUKE TYLER.

REFERENCES CITED

The following references are of record in the file of this patent:

UNITED STATES PATENTS

| Number | Name | Date |
| --- | --- | --- |
| 873,783 | Randall | Dec. 17, 1907 |
| 1,463,117 | Gilmore et al. | July 24, 1923 |